(12) United States Patent
Salazar-Ferrer et al.

(10) Patent No.: US 7,429,974 B2
(45) Date of Patent: Sep. 30, 2008

(54) DEVICE FOR MANIPULATING IMAGES, ASSEMBLY COMPRISING SUCH A DEVICE AND INSTALLATION FOR VIEWING IMAGES

(75) Inventors: Pascal Salazar-Ferrer, Chevreuse (FR); Yves Trousset, Palaiseau (FR); Jean-Michel Marteau, Asnieres (FR); Sonia Da Silva, Igny (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 668 days.

(21) Appl. No.: 10/722,847

(22) Filed: Nov. 26, 2003

(65) Prior Publication Data

US 2005/0024323 A1 Feb. 3, 2005

(30) Foreign Application Priority Data

Nov. 28, 2002 (FR) .................................. 02 14992

(51) Int. Cl.
G09G 5/00 (2006.01)
(52) U.S. Cl. ........................ 345/156; 345/157; 345/163; 345/168; 345/184
(58) Field of Classification Search ................ 345/156, 345/157, 160, 161, 163, 168, 169
See application file for complete search history.

(56) References Cited

U.S. PATENT DOCUMENTS

| 5,230,623 | A | * | 7/1993 | Guthrie et al. ................. 433/72 |
|---|---|---|---|---|
| 5,566,586 | A | | 10/1996 | Schobinger et al. |
| 6,068,554 | A | | 5/2000 | Tyler |
| 6,198,472 | B1 | | 3/2001 | Lection et al. |
| 6,243,096 | B1 | * | 6/2001 | Takanashi .................... 345/419 |
| 6,342,878 | B1 | * | 1/2002 | Chevassus et al. .......... 345/158 |
| 6,400,157 | B1 | * | 6/2002 | Bonanni et al. ............. 324/322 |
| 6,853,365 | B2 | * | 2/2005 | Reid et al. ................... 345/163 |
| 2003/0016417 | A1 | * | 1/2003 | Lee ............................. 359/142 |
| 2003/0090394 | A1 | * | 5/2003 | Zagnoev ...................... 341/22 |

FOREIGN PATENT DOCUMENTS

GB 2 228 065 A 8/1990

OTHER PUBLICATIONS

"Space Mouse", 2000 RSI GmbH, Zeisigweb 24, D-61440, Oberursel, Germany.
Balakrishnan et al., "The Rockin' Mouse: Integral 3D Manipulation on a Plane", Mar. 27, 1997; CHI 97 Electronic Publications, Atlanta, GA, p. 2, line 55.

* cited by examiner

Primary Examiner—Richard Hjerpe
Assistant Examiner—Jennifer T Nguyen
(74) Attorney, Agent, or Firm—Cantor Colburn LLP

(57) ABSTRACT

A peripheral device for manipulating 3D images comprising a gripping element to be manipulated by user, a transmission of command information to a processor as a function of shift and/or efforts applied by the user on the 3D device. An actuator is controlled by the user to control the processor to switch from one operating mode where the gripping element is used for manipulating 3D images to another operating mode where the device is used as a pointer or selection device and vice versa. The peripheral device is placed in a surgical theater and/or examination room, on the side of a table for patients.

3 Claims, 3 Drawing Sheets

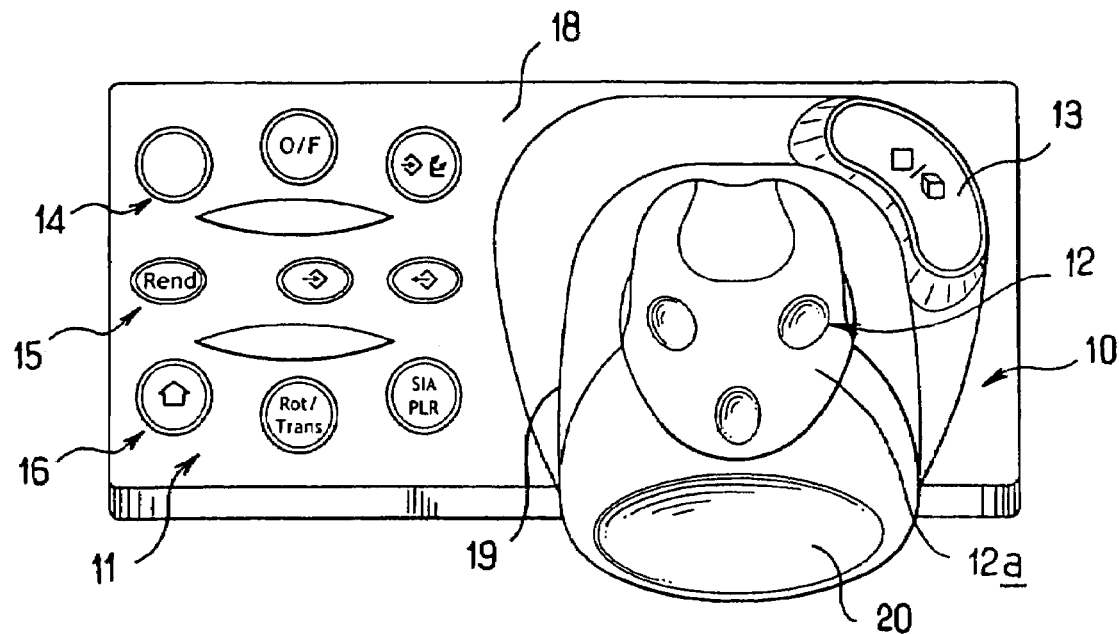
FIG_3
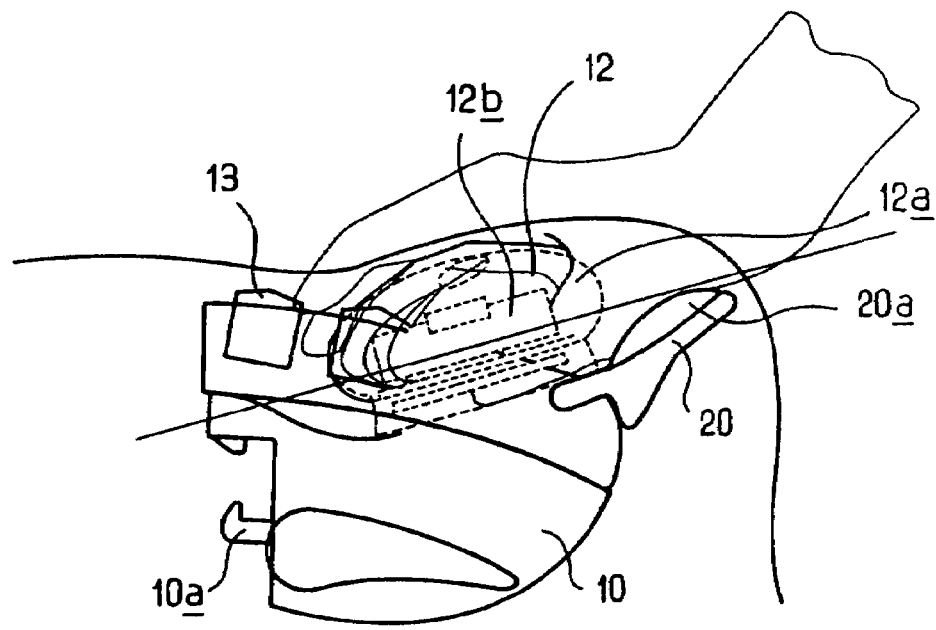
FIG_4

DEVICE FOR MANIPULATING IMAGES, ASSEMBLY COMPRISING SUCH A DEVICE AND INSTALLATION FOR VIEWING IMAGES

CROSS-REFERNCE TO RELATED APPLICATIONS

This application clams the benefit of a priority under 35 USC 119 (a)-(d) to French Patent Application No. 02 14992 filed Nov. 28, 2002, the entire contents of which are hereby incorporated by reference.

BACKGROUND OF THE INVENTION

An embodiment of the invention and equivalents thereof relates to a peripheral device for manipulating images. The peripheral device can be used for manipulating 3D images, particularly in a surgical theatre and/or an examination room that can be for radiology. An embodiment of the invention and equivalents thereof also relates to an installation for viewing images in a surgical theater and/or examination room.

There is a growing demand for medical practitioners, such as a radiologist or surgeon, to be able to freely manipulate 3D images directly during surgery or examination. Imaging installations in an examination room or a surgical theater do not fully allow this manipulation and examination of 3D images is mostly done in a room adjoining the surgical theatre or examination room. If medical imaging systems are known comprising a peripheral device for manipulating 3D images, this peripheral device is generally incompatible with use and implementation in a surgical theatre or examination room. In particular, medical imaging systems are known which, apart from commands and switches and, if required, touch screens, integrate a peripheral device with an articulated control lever or joystick for manipulating 3D images. Such a peripheral device are further limited in terms of flexibility and do not enable easy manipulation when an image is being viewed, for example, during a surgical operation.

Furthermore, a disadvantage of a peripheral device of the joystick type is that it has ergonomics mismatching a surgical theater or examination room, where any protrusion should be avoided, as it would be likely to catch or injure patients.

Furthermore, and particularly in computer-assisted/aided design, systems using a peripheral device for manipulating a 3D image is known which. comprise a gripping head articulated along at least three degrees of freedom and connected to transmitters of position or effort allowing the movements or efforts exerted by the user on the gripping head in movement in space to be transcribed. An example of a peripheral device is described in U.S. Pat. No. 4,785,180.

These peripheral devices are provided only for manipulating 3D images.

Additionally, a drawback to this device is that it monopolizes both hands of the surgeon or the radiologist, the right hand for example being used to manipulate the keyboard and/or the 2D pointer, while the left hand is being used to manipulate the gripping head.

BRIEF DESCRIPTON OF THE INVENTION

An embodiment of the invention is directed to a peripheral device for manipulating 3D images, having a gripping element to be manipulated by user, as well as means allowing command information in terms of shifts and/or efforts applied by the user on the gripping element to be transmitted to means for processing, comprising means for actuation by the user for commanding the means for processing, to flip over or switch from one operating mode where the gripping element is used for manipulating 3D images to an operating mode where the gripping element is used as a 2D pointer or selection tool and vice versa.

An embodiment of the invention is also directed to an assembly comprising a peripheral device for manipulating 3D images, comprising a device to be manipulated by user, means for processing which memorizes 3D modelling, means for linking via which the peripheral device transmits to the means for processing command information as a function of shift and/or effort applied by the user on the device to be manipulated by user, at least one means for display of images, means for linking via which means for processing transmit to the means for display the images to be displayed, these images being a function of the command information transmitted to the means for processing by the peripheral device, wherein in one operating mode, the device to be manipulated by user controls 2D navigation on the means for display, the means for processing comprising means for, in the one operating mode, as a function of the command information transmitted by the peripheral device, for controlling 2D displacement of a pointer displayed on the means for display and/or selecting given functions as a function of the position of the pointer the assembly comprising means for actuation by the user for controlling the means for processing to flip over from one operating mode where the device to be manipulated by user is used for manipulating 3D images to another operating mode where the device is used for controlling 2D navigation on the means for display and vice versa.

An embodiment of the invention is directed to an installation for viewing medical images, comprising such an assembly, the peripheral device being placed in a surgical theater and/or examination room, particularly on an edge of a table intended for a patient. A further example of an installation for viewing images is described in co-pending patent application filed as of even date in the name of Da Silva et al., entitled "Method and Assembly for Processing, Viewing and Installing. Command Information Transmitted by a Device for Manipulating Images," (GE Docket 130599), which claims a priority under 35 USC 119(a)-(d) to French Patent Application No. 02 14994 filed on Nov. 28, 2002, the entire contents of which are hereby incorporated by reference.

BRIEF DESCRIPTION OF THE DRAWINGS

Other characteristics and advantages of the invention will emerge from the following description, which is provided by way of illustration and is non-limiting and should be read with reference to the attached diagrams, in which:

FIG. 3 illustrates an embodiment of the keyboard and 3D "joystick" placed in the surgical theater;

FIG. 4 is a diagrammatical representation in section of the keyboard and a device to be manipulated by user of FIG. 3 and illustrates positioning of a hand of a medical practitioner on the keyboard or the device;

DETAILED DESCRIPTION OF THE INVENTION

Figure 1:
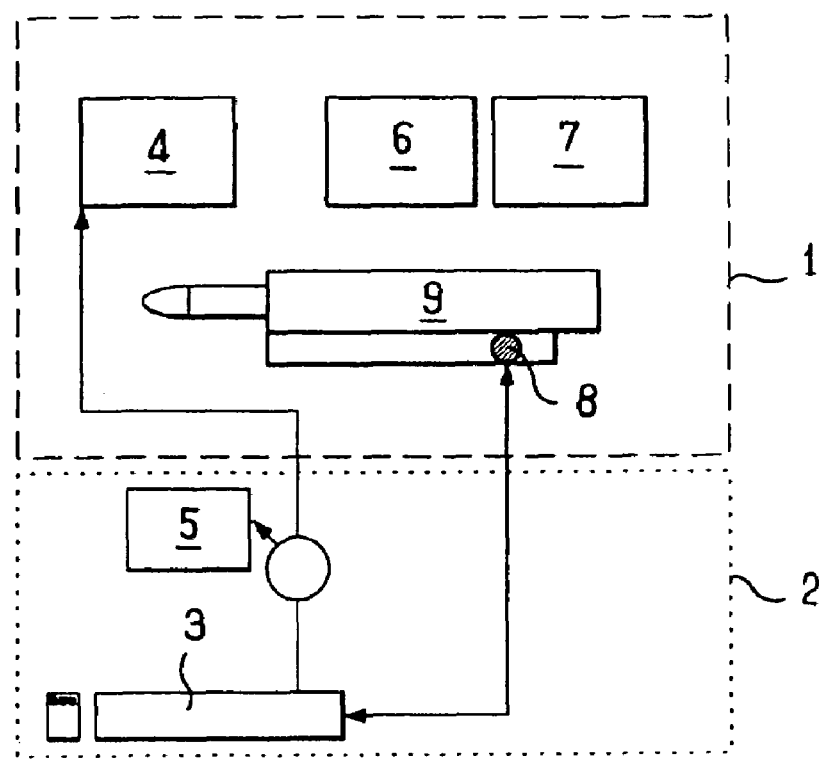
FIG. 1 illustrates a surgical theater/control room distribution of means for interface in an embodiment of the invention.

FIG. 1 illustrates a surgical theater and/or examination room 1, and an adjacent control room 2 in which an image processing unit 3 is placed. Unit 3 manages a display of 3D images corresponding to data it receives from a medical image acquisition device (not shown here) placed in the room 1 (for example, a fluoroscopic acquisition device of the type with arms in C). Unit 3 receives command information from a peripheral device 8 which is manipulated by a medical practitioner and which is placed in the surgical theater and/or examination room 1, on the side of a table 9 for patients. Unit 3 controls the display of 3D images on viewing monitors 4 and 5 placed in room 1 (monitor 4), the other (monitor 5) in the adjacent control room 2. Cables connect unit 3 to the peripheral device 8 and to the monitors 4 and 5. Other means could also be used (for example, RF transmission).

The surgical theater and/or examination room 1 additionally comprises at least two other monitors 6 and 7, displaying further images which may be linked to the image of monitor 5 via unit 3 and as a function of command instructions transmitted by the medical practitioner via the peripheral device 8.

Figure 2:
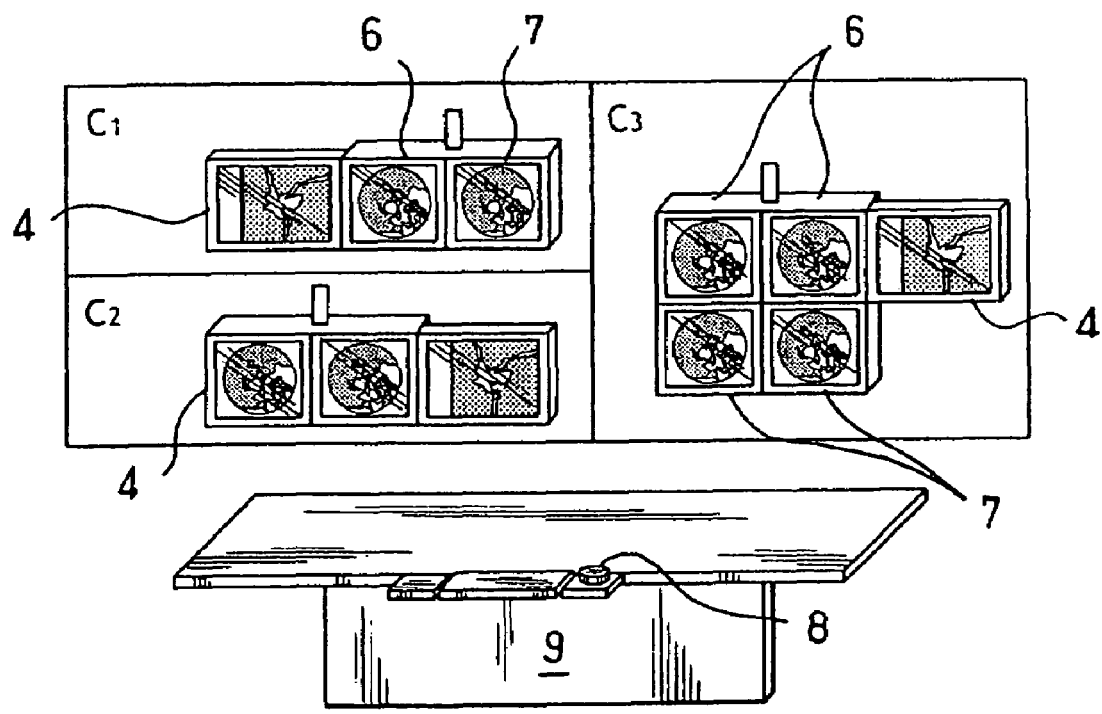
FIG. 2 illustrates an arrangement in the surgical theater of means for interface in an embodiment of the invention.
Figures 5A, 5B, 5C, 5D:
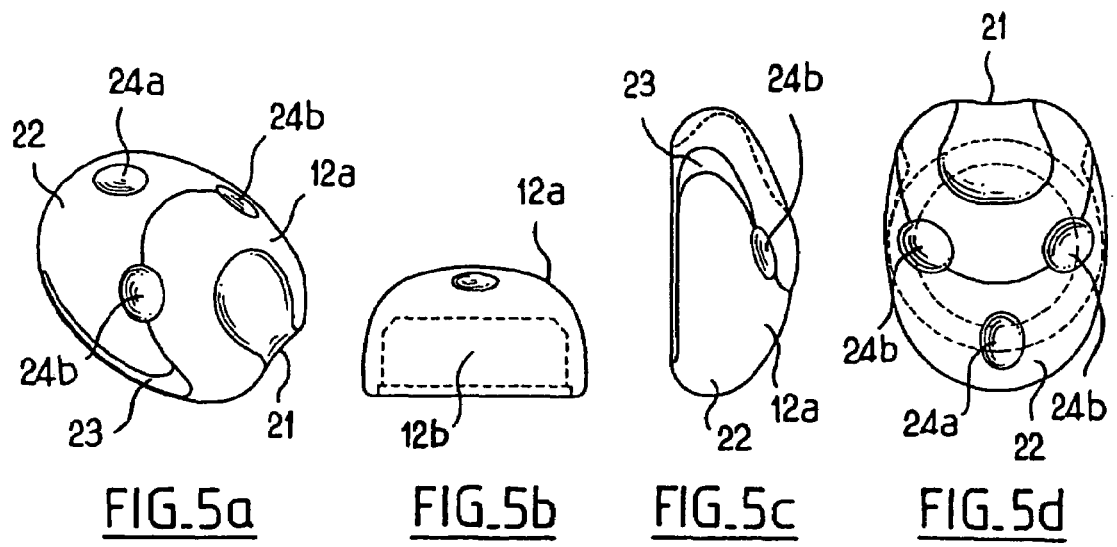
FIGS. 5a to 5d are respectively a perspective view, two side views and a plan view of the device to be manipulated by user of FIGS. 3 and 4.

Monitor 4 in room 1 can be a flat-screen monitor, effectively minimizing its size. Monitor 4 can be attached to a wall of the room 1, located where any risk of collision with the patient is avoided. Monitor 4 can be arranged, for example, opposite the operating table, on the side opposite the peripheral device 8. For example, monitor 4 can be placed to the left of monitors 6, 7 (configuration C1 in FIG. 2) and optionally, if this is not possible or desirable or if there is a risk of collision with the patient, to the right thereof (configuration C2 or C3 in FIG. 2).

FIGS. 3, 4 and 5a to 5d show the peripheral device 8 manipulated by the medical practitioner. Peripheral device 8 is in the form of a casing 10 integrating a keyboard 11 component and a manipulating device 12. Casing 10 comprises elements 10a, projecting relative to one of its faces, and for example of the elastic jaw type, which allow it to be fixed to the edge of the table 9. When it is in place on the edge, the casing 10 presents the operator or medical practitioner with a control panel (plate 18) having a left section reserved for the keyboard 11 while the right section is where both the device 12 to be manipulated by user is housed and also where a two-way button 13 is located whose function will be explained in detail below. Keyboard 11 may have nine buttons distributed in three rows, designated as 14, 15, and 16. The different buttons can be flush relative to the casing 10. The buttons allow the operator or medical practitioner to easily locate them by feel without offering any grip likely to injure. The button in the middle of the center row may be slightly offset relative to the button in the middle of the two other rows, enabling it to be located by feel.

The buttons of the lower and upper rows may be convex in form and of circular section, whereas the buttons of the middle row, likewise convex in shape, may be elliptical in section. The terms "lower or "upper" are to be understood here and in the following text relative to what is presented to the user when the casing 10 is in place on the table 9 and when the user is in front of the casing at the table. Thus the "lower" row is the one that is farthest from the user, while the "upper" row is the closest one. The same applies to the terms "front" and "rear" which are likewise used in the following text, the "front" part of the casing 10 being that which is the farthest from the medical practitioner when the casing 10 is in place on the table 9 and when the user is in front of the casing 10 and the table 9.

On the right side of the casing 10, a plate 18 exhibits a concave tray 19 housing the device 12 to be manipulated by user. In this way, the device 12 protrudes only slightly relative to the rest of the plate 18.

At the rear of the plate 18, tray 19 is prolonged by a wall 20 forming a wrist-rest on which the user can support a wrist when manipulating the device 12. As can be seen more particularly in FIG. 4, wall 20 has piping 20a intended to act as support zone for the user. The form of wall 20 forming the wrist-rest also helps guide the hand of the user when taking hold of the device 12, while the latter is for example protected under a sterile sheet and not in view.

Device 12 may function, for example, as described in U.S. Pat. No. 4,785,180. The device 12 comprises a head 12a and means 12b for forming sensors, such as of the optoelectronic type, and which are suitable for detecting six shift components (three translation components and three angular components) imposed by the user on the head 12a of the device. Means 12b detect in particular the movements of translation and switching relative to a hand reference plane (in which the optical sources of the means 12b forming transmitters are arranged) that, instead of being horizontal, is slightly inclined relative to the horizontal when the casing 10 is in place on the table 9. The inclination can be for example between 10 and 20°, particularly of the order of 15°. Head 12a of the device 12 generally inclines, allowing the hand of the operator to assume a natural position, and is therefore not a source of fatigue for the operator when the operator is standing in front of the device 12 and the table.

Additionally, as shown in FIGS. 5a to 5d, head 12a is formed in a general elongated hemispheric shape in one direction (which, when the casing 10 is in place, is perpendicular to the general direction in which the operating and/or examination table 9 extends). On a front part of head 12a, intended to be the farthest from the user, head 12a terminates in a substantially straight edge 21; the rear part o head 12a terminates in a form 22 of arched section. In this way the head 12a reminds the user of the shape of a conventional 2D mouse, even if it is the head of a manipulating device.

Head 12a has a groove 23 extending partly over the sides of the head 12a, as well as on its front part, enclosing it partially. Groove 23 facilitates the gripping of the head 12a by the user and further comprises a positioning marker for the hand of the user.

Head 12a exhibits on its face directly opposite the user, at the rear thereof, three recesses 24a, 24b spread out in a triangle, one of which, 24a, is arranged centered behind head 12a, the two others, 24b, offset towards the front and distributed on either side of an axis of symmetry which the head 12a presents and which extends in its longitudinal direction. The recesses 24a, 24b comprise markers (right/left and front/rear) for the hand of the user.

On the right side of casing 10 is button 13. Various functions can be controlled by button 13, and device 12. Button 13 has a general bean shape and is placed at the right edge of the tray 19, at the front. The medical practitioner user can access button 13 by hand when the hand is in a position on the head 12a of the device.

Figure 6:
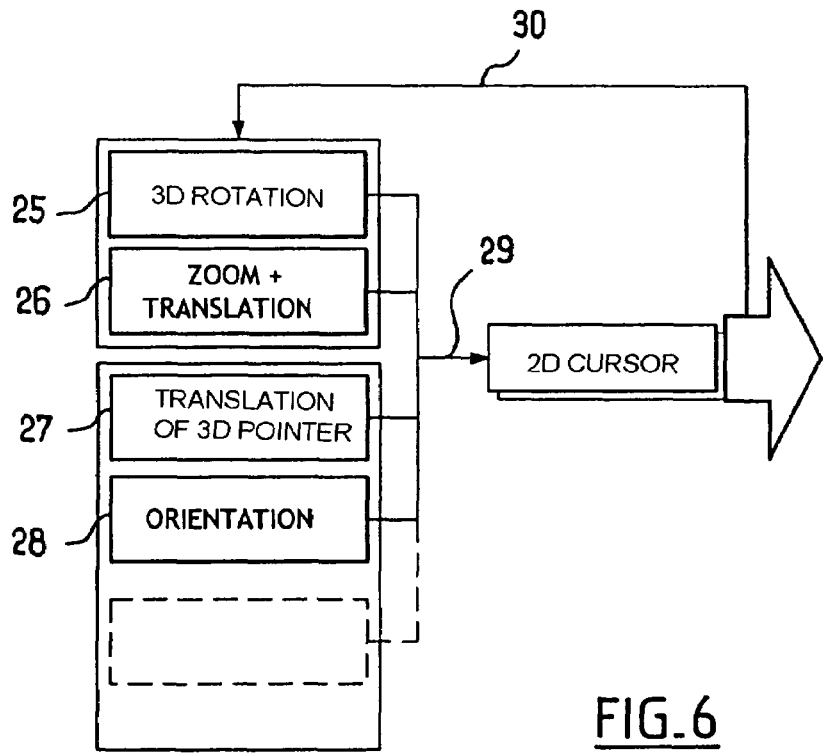
FIG. 6 is a block diagram illustrating different functionalities controlled by means for interface of the type shown in FIG. 3 or FIG. 4.

As illustrated in FIG. 6, in a first mode the device 12 controls rotation of the 3D images on a means for display, such as a screen. Whenever the user actuates button 13, the button 13 allows switching function from one operating mode to another operating mode and vice versa. In a first operating mode the peripheral device 12 is used as a 3D mouse and in a second or another operating mode, the same device 12 is used as a 2D pointer. In the second or another operating mode, i.e., as a pointer, to direct on the monitor screens 4 and 5 movements of the pointer, allowing, for example, functions in a means for interface, e.g., a menu, appearing on the screens to be selected.

In the 3D operating mode, it suffices for the user to press on any of the buttons of monitors 4 and 5 dedicated to the selection of one of the 3D device operating modes. This can also be done from the control room. Furthermore, the user can achieve this by using one of the buttons of the keyboard 11. The 3D functions which are accessible from the keyboard 11 or the device 12 used in 3D operating mode are also all accessible by using the device 12 in its operating mode as a 2D pointer, with a menu displayed on the screens 4 and 5 then permitting the user to select the functions desired.

FIG. 6 describes the use of the device 12 in 3D mode. When the device is used in 3D mode, the different buttons of the software user interface on monitors 4 and 5 allow the user to select different modes for manipulating 3D images which the unit 3 displays on the screens of monitors 4 and 5. A first mode is that of the 3D rotations (mode 25 in FIG. 6). In this mode, the action of the device 12 controls only the rotation in space movements on the 3D images displayed. In another mode (mode 26), the action of the device 12 controls only the zoom of the 3D modelling images displayed, as well as movements of translation in space of these images.

Apart from the two main modes, other modes control translation movements of the 3D pointer (mode 27), or modifications of orientation of oblique planigraphic planes (mode. 28), etc.

Arrow 29 in FIG. 6 illustrates switching by button 13 in an operating mode wherein the device 12 is used to effect 2D navigation, i.e., a mode with the 2D shift of a cursor for pointing a target (for instance, a button) on the software interface and the selection of this target (for instance, a click), that is controlled by button 13. Arrow 30 illustrates a return to an operating 3D mode.

The entirety of the functions controlled by the peripheral device in 2D mode or in 3D mode, such as switching from 2D mode to 3D mode or vice versa, is managed, as a function of command signals received by unit 3 originating from peripheral device 12, by means for interface, such as a program in the memory of unit 3.

The peripheral device 12 can be used not only for manipulating 3D images, but also as a 2D navigation mouse. The peripheral device 12 is easy to manipulate, even under difficult surgical or examination conditions, and especially even when the user is wearing surgical gloves or when the casing and the keyboard and the device are covered with a sterile sheet preventing the medical practitioner from viewing the keyboard and device. The assembly of casing, keyboard and device 12 is also easy to clean, and of a size compatible with the restrictions of a control panel on a side of a table used for surgery and/or examination. The assembly is also adapted to manipulating by a user in the upright position. The user can use only one hand to carry out such manipulations of needed and/or desired and/or selected images, and the other hand is thus being free to attend to the patient. The wall guide 20 behind the casing helps stabilize the hand and the wrist of the user and accordingly permits precise movements of the device 12.

One skilled in the art may make or propose various modifications in structure/way and/or function and/or result to the disclosed embodiments and equivalents thereof without departing from the scope and extant of the invention.

What is claimed is:

1. An assembly comprising:
a peripheral device for manipulating images by a user;
means for processing having a memory for image modelling;
means for linking by which the peripheral device transmits to the means for processing command information as a function of shift and/or efforts applied by the user on the device;
at least one means for displaying an image;
means for linking by which the means for processing transmit to the means for display an image to be displayed, the image being a function of the command information transmitted to the means for processing by the peripheral device;
wherein in one operating mode the device controls 2D navigation on the means for display;
the means for processing comprising means in the one operating mode, as a function of the command information transmitted by the peripheral device, for controlling a 2D shift of a pointer displayed on the means for display and/or selecting given functions as a function of the position of the pointer;
the assembly comprising means actuated by direct manual input by a hand of the user to control the means for processing to switch to another operating mode for manipulating 3D images from the one operating mode where the device is used to control 2D navigation on the means for display and vice versa.

2. An installation for viewing images comprising:
an assembly as claimed in claim 1 wherein the peripheral device is placed in a surgical theater and/or examination room.

3. An installation as claimed in claim 2 wherein the peripheral device is placed in a surgical theater and/or examination room, on the edge of a table intended for patients.

\* \* \* \* \*